(12) United States Patent
Rosenthal et al.

(10) Patent No.: US 8,967,471 B1
(45) Date of Patent: Mar. 3, 2015

(54) DETECTING A MALFUNCTIONING DEVICE

(71) Applicant: Square, Inc., San Francisco, CA (US)

(72) Inventors: Nathan Rosenthal, San Francisco, CA (US); Zachary Brock, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/331,090

(22) Filed: Jul. 14, 2014

Related U.S. Application Data

(63) Continuation-in-part of application No. 14/091,019, filed on Nov. 26, 2013, now Pat. No. 8,777,104.

(51) Int. Cl.
*G06K 7/00* (2006.01)

(52) U.S. Cl.
CPC .................................... *G06K 7/0095* (2013.01)
USPC ............ 235/438; 235/379; 235/380; 235/381

(58) Field of Classification Search
USPC ............... 235/438, 379, 380, 381; 705/14.27, 705/14.33, 43
See application file for complete search history.

(56) References Cited

U.S. PATENT DOCUMENTS

| | | | |
|---|---|---|---|
| 5,861,614 A | 1/1999 | Gardner | |
| 2002/0123972 A1* | 9/2002 | Hodgson et al. | 705/72 |
| 2013/0304561 A1* | 11/2013 | Warner et al. | 705/14.33 |
| 2013/0331675 A1 | 12/2013 | Batman et al. | |

OTHER PUBLICATIONS

Ex-Parte Quayle Action Mailed Jan. 31, 2014 in Co-Pending U.S. Appl. No. 14/091,019 of Brock, Z., et al., filed Jan. 31, 2014.
Notice of Allowance mailed Apr. 7, 2014, for U.S. Appl. No. 14/091,019, of Brock, Z. et al., filed Nov. 26, 2013.

* cited by examiner

*Primary Examiner* — Allyson Trail
(74) *Attorney, Agent, or Firm* — Perkins Coie LLP

(57) ABSTRACT

Technology is disclosed for detecting a malfunctioning electronic device. The technology can receive payment information for multiple successfully completed transactions, wherein the payment information includes card-present transactions and card-not-present transactions, and determine status of an electronic device based at least in part on the payment information for the successfully completed transaction.

20 Claims, 8 Drawing Sheets

DETECTING A MALFUNCTIONING DEVICE

This patent application is a Continuation-In-Part of commonly assigned U.S. patent application Ser. No. 14/091,019, filed on Nov. 26, 2013, entitled "Detecting A Malfunctioning Device Using Sensors," which will soon issue as U.S. Pat. No. 8,777,104, the disclosure of which is incorporated herein by reference in its entirety.

BACKGROUND

People use a multitude of electronic devices. Some of these electronic devices can be attached to various computing devices, such as smart phones, for example an iPhone™, or tablet computing devices, for example an iPad™. One example of such an electronic device is a payment card reader ("card reader"), e.g., a magnetic card reader provided by payment processing companies such as Square, Inc. A card reader can read various types of payment cards, e.g., credit cards or debit cards. Some card readers are made such that the card reader can be attached to a device such as a smart phone or tablet to process a payment made by "swiping" a payment card through or proximate to the card reader.

These electronic devices occasionally fail. When an electronic device fails, and if the electronic device is covered by a warranty or a replacement plan, some users will take prompt action to replace the electronic device. Other users may not take prompt action. For example, the user may be busy and may not have the time to obtain a replacement electronic device. Alternatively, the user may not consider the electronic device to be very important, so the user may decide that replacing the electronic device is not worth the time or hassle it could take. However, payment processing companies would still prefer to replace failed or failing electronic devices, e.g., so that it does not become difficult for users to use payment processing services provided by the companies.

BRIEF DESCRIPTION OF THE DRAWINGS

Embodiments of the present invention will be described and explained through the use of the accompanying drawings in which.

Figure 1:
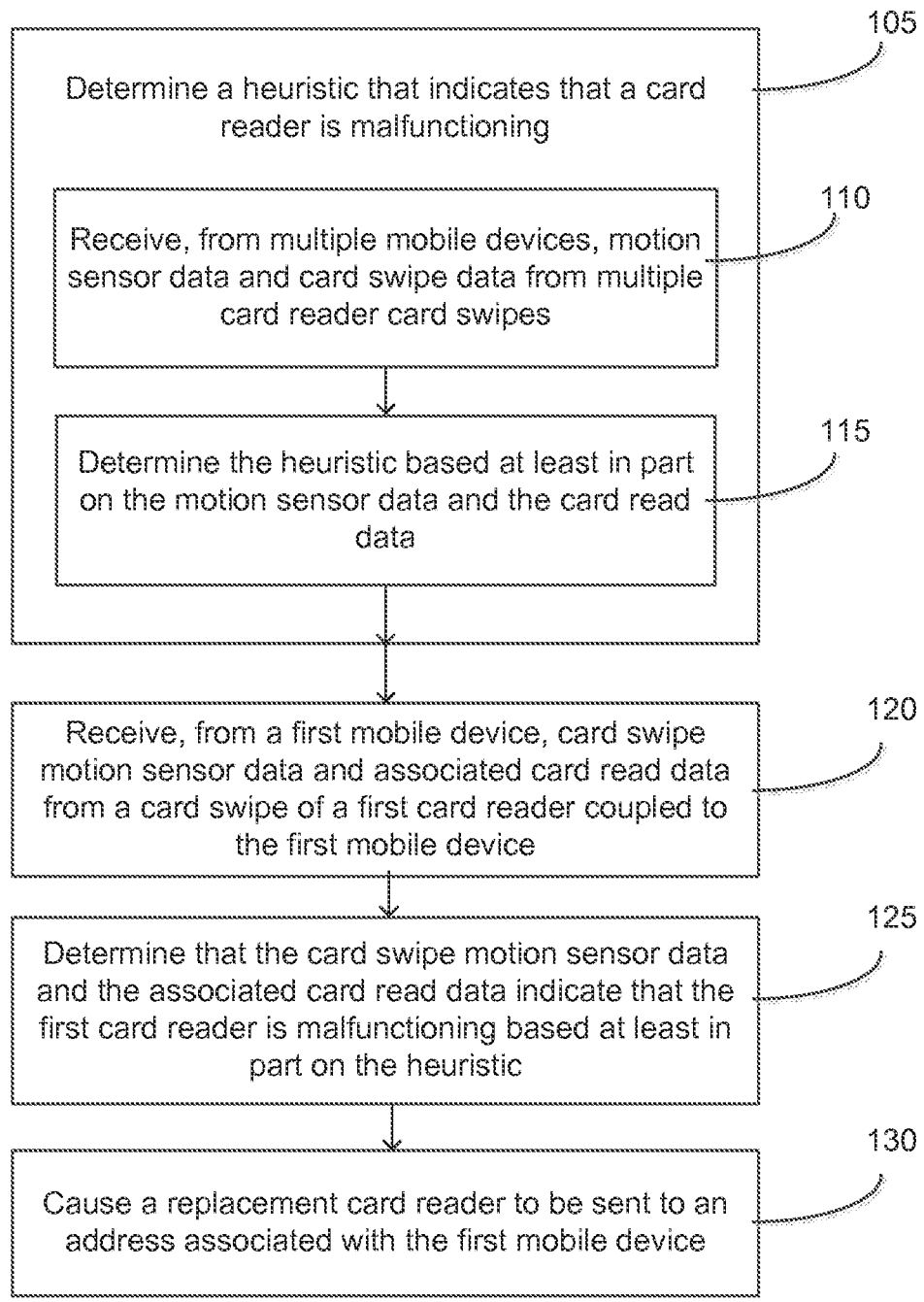
FIG. 1 is a flow chart illustrating operations of a method for detecting a malfunctioning card reader.

The drawings are not necessarily drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of the appended claims.

DETAILED DESCRIPTION

Technology is disclosed for detecting, based on successfully completed transactions, that an electronic device is failing (e.g., is malfunctioning). In various embodiments, the technology computes and tracks a ratio of card-present ("CP") transactions to card-not-present ("CNP") transactions, and determines that the electronic device is failing. The technology may then take various actions. A CP transaction occurs when a merchant (also referred to herein as a "user") swipe's a customer's physical payment card using the electronic device. Swiping a payment card can cause the electronic device to read payment information embedded or otherwise associated with the card, e.g, in magnetic form (in the case of conventional payment cards) or in electronic form (in the case of smart cards or similar electronic payment cards). A CNP transaction occurs when the merchant completes a transaction without swiping a payment card, e.g., by entering identifying information such as the credit card number, into a computing device. The technology includes a server component that monitors and tracks successful CP transactions and successful CNP transactions. The monitoring and tracking can be on a per-merchant, per electronic device, and/or per computing device (e.g., a computing device to which the electronic device is electronically and/or communicably coupled).

If the CP/CNP transaction ratio for a particular electronic device decreases, the technology may determine that the electronic device is failing. If, however, the CP/CNP ratio for the electronic device decreases when the electronic device is associated with a first computing device but is substantially unchanged (or increases) when the electronic device is associated with a different computing device, then the technology may determine that the electronic device is not failing. Alternatively, if the CP/CNP transaction ratio decreases for a particular device when the electronic device is used with a computing device that is indicated (e.g., in a database of know computing device types) that the computing device is problematic, then the technology may determine that the electronic device is not failing.

If the technology determines that the electronic device is failing, it may take various actions. As an example, the technology may cause a replacement electronic device to be sent to the merchant. Alternatively, the technology may cause a communication to be sent to the merchant, e.g., with instructions on how to improve the reliability of the electronic device. As an example, the communication may indicate to use a different type of computing device. The communications can be one or more of an electronic mail message, a facsimile, a letter or postcard sent via conventional postage, a social networking message, a cell phone short messaging service ("SMS") message, etc.

This application also discloses technology related to detecting a malfunctioning device using sensors. An electronic device, such as a card reader, can be attached to a mobile device, such as a smart phone. The smart phone has an integrated motion sensor. An application can run on the smart phone can use the motion sensor to determine, for example, when the electronic device has malfunctioned or is about to malfunction. The application can determine that the card reader has malfunctioned by analyzing motion sensor data to detect movements indicating multiple card swipes. If the card reader did not read any data from the card during any of the multiple card swipes, the application can determine that the card reader is malfunctioning. The application can cause a replacement card reader to be sent to replace the malfunctioning card reader.

Applications exist where a company generates revenue from the use of an electronic device connected to a mobile device. For example, a payment processing company can generate revenue when a user uses an electronic device, such as a card reader, in combination with a mobile device, such as a smart phone, to receive a payment. If the card reader fails, the user may not be able to process a payment made using a credit card, and the payment processing company can lose revenue due to the lost payment due to the malfunctioning card reader.

Such a company is negatively financially impacted when the electronic device fails, and the company is motivated to rapidly replace the defective electronic device. For example, the previously discussed payment processing company can lose revenue due to lost payment transactions when a card reader fails, so the payment processing company is motivated to rapidly replace the malfunctioning card reader. The payment processing company is unsatisfied waiting for the user to report the defective card reader, as the user may take a significant amount of time to file the report, or may even choose to not file a report. The payment processing company, and other companies with similar concerns, would like to detect when an electronic device malfunctions, so that the company can proactively replace the malfunctioning device.

Many mobile devices, such as smart phones and tablets, include integrated sensors such as motion sensors. An application running on the smart phone can utilize the motion sensors to determine the physical movement of the smart phone. For example, the smart phone can be physically connected to a card reader such that the card reader and the smart phone move in unison. A user can perform a card swipe to read, for example, a credit card using the card reader. The physical motion of swiping the card through the card reader causes the smart phone to move in a distinct fashion. The distinctive fashion of motion can include, for example, the motion and acceleration that occurs during the card swipe, as well as the vibrations that occur during the card swipe. The application running on the smart phone can use motion data from the motion sensor to determine that the phone has moved in a way indicative of a card swipe.

The application can further communicate with the electronic device, such as the card reader. During a successful card swipe of a credit card, the card reader reads data from the magnetic stripe of the credit card. The application can determine from the card read data that a successful card swipe occurred.

The application, using the data from the motion sensors, can determine that the motion sensor data indicates that a card swipe occurred. Combining the detection of a card swipe with data from the card reader, the application can determine that the card reader did not successfully read the data from the swiped card. For example, the application using the motion sensor data can determine that a card swipe occurred. The application can also use the communications from the card reader to determine if the associated card read was successful.

When the motion sensor data indicates that a card swipe has occurred, but no data was received from the card reader, the application can determine that the card swipe was unsuccessful. Based on this result, or combined with data from other card swipes, the application can determine that the card reader is malfunctioning. The application can cause a replacement card reader to be sent to replace the malfunctioning card reader.

TERMINOLOGY

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to various embodiments," "in the embodiments shown," "in one embodiment," "in other embodiments," and the like generally mean the particular feature, structure, or characteristic following the phrase is included in at least one implementation of the disclosed technology. In addition, such phrases do not necessarily refer to the same embodiments or to different embodiments.

If the specification states a component or feature "may", "can", "could", or "might" be included or have a characteristic, that particular component or feature is not required to be included or have the characteristic, but can be included.

The term "module" refers broadly to software stored on non-transitory storage medium (e.g., volatile or non-volatile memory for a computing device), hardware, or firmware (or any combination thereof) components. Modules are typically functional components that can generate useful data or other output using specified input(s). A module may or may not be self-contained. An application program (also called an "application") may include one or more modules, or a module can include one or more application programs.

FIG. 1 is a flow chart illustrating operations of a method for detecting a malfunctioning card reader. The following description of FIG. 1 will be described using the system illustrated in FIG. 2, and will refer to labels of that figure. This is a non-limiting example and is done with the intent of making the description of FIG. 1 easier to understand. It is noteworthy that, in some embodiments, including the embodiment of FIG. 2, all steps of the method of FIG. 1 can be carried out by computer system 220. Computer system 220 can be computer system 700 of FIG. 7.

Step 105 includes determining a heuristic that indicates that a card reader is malfunctioning. Steps 110 and 115 are one set of steps that can perform the determination of step 105. An example of a heuristic that indicates that a card reader is malfunctioning is a combination of motion sensor data indicating multiple card swipes, and associated card read data from or associated with the card swipes indicating that none of the associated card reads were successful. The card reader can be physically coupled to the mobile device such that the two devices move in unison during the card swipe, and the motion sensor can be integrated in the mobile device. A second example of a heuristic that indicates that a card reader is malfunctioning is a first set of motion sensor data and associated card read data indicating multiple card swipes in a predetermined time period and no successful card read in the predetermined time period.

A card swipe is when a user swipes a card through a card reader. An example of a card swipe is when user 225 swipes card 215 through card reader 210. The card swipe motion causes the magnetic stripe of card 215 to pass through card reader 210 such that card reader 210 can read the data from the magnetic stripe. A card read is when a card reader, such as card reader 210, reads data from the magnetic stripe of a card, such as card 215, during a card swipe. For example, when card 215 is swiped through card reader 210, card reader 210 can read the data of the magnetic stripe of card 215. Card read data is the data from a card read. For example, card read data can be the data generated by card reader 210 during or associated with a swipe of card 215 through card reader 210 by user 225. The card read data can include the data read from the magnetic stripe of card 215, as well as other information or data. For example, the card read data can include information as to whether or not the card read was successful, time and date information, information related to the purpose for which the card swipe is happening (for example, information such as a sales price for a purchase transaction, when the card swipe is to pay for the purchase transaction).

Step 110 includes receiving, from multiple mobile devices, motion sensor data and card read data from multiple card reader card swipes. Using the example of FIG. 2, card reader 210 can be directly and physically coupled to mobile device 205, a smart phone in this example, such that card reader 210 and mobile device 205 move in unison. Mobile device 205 can include a motion sensor, which can be integrated, and which indicates motion by generating data that characterizes the motion. For example, the motion sensor can generate data representing an acceleration vector for the motion sensor, which indicates an acceleration of the motion sensor along that vector. When user 225 swipes card 215 through card reader 210, both card reader 210 and mobile device 205 can move in unison. The card swipe motion causes the magnetic stripe of card 215 to pass through card reader 210 such that card reader 210 can read the data from the magnetic stripe.

As discussed above related to step 105, an example of a heuristic indicating a card reader malfunction is a combination of motion sensor data indicating multiple card swipes, and associated card read data indicating that none of the associated card reads were successful. A method of detecting a card swipe may be needed to determine this heuristic.

In some cases, a card swipe can be detected by a card reader performing a card read. Card reader 210 can send a notification of a successful or failed card read, the notification serving the additional purpose of indicating that a card swipe occurred. In some cases, such as when card reader 210 is malfunctioning such that it does not indicate that a card swipe occurred, or when card reader 210 does not send a notification of a card read, an additional method of detecting a card swipe can be needed.

To determine a heuristic that indicates that a card reader is malfunctioning, an additional method of detecting a card swipe (i.e., a card swipe detect method) may be needed. The card swipe detect method can be based on motion sensor data. When a user does a card swipe, the card swipe can have a distinctive motion pattern. The distinctive motion pattern can include, for example, the motion and acceleration that occurs during the card swipe, as well as the vibrations that occur during the card swipe. Motion sensor data from multiple card reader card swipes, along with the associated card read data, can be collected. For example, motion sensor and card read data from a number of card swipes by a number of different users using a number of different card readers, each card reader coupled to a different mobile device, can be collected. As a second example, motion sensor and card read data from a number of card swipes by one user using one card reader coupled to one mobile device can be collected. The collected data can be analyzed to determine the characteristics of the distinctive motion pattern associated with a card swipe.

As an example of the collected data, user 225 can perform a card swipe by swiping card 215 through card reader 210. Card reader 210 can send a notification of a successful or unsuccessful card read, thereby notifying a software application running on mobile device 205 of a card swipe. The software application can collect the motion sensor and card read data from or associated with the card swipe. Mobile device 205 can send this motion sensor and card read data to, for example, computer system 220. Similar data can be collected from a number of card swipes by a number of users using a number of card readers. Step 110 can include computer system 220 receiving, from multiple mobile devices, motion sensor data and card read data from multiple card reader card swipes.

Step 115 includes determining the heuristic based at least in part on the motion sensor data and the card read data. Step 115 can occur after step 110. Using the example of FIG. 2, the motion sensor and card read data can be the data received by computer system 220 during step 110. As discussed above related to step 105, an example of a heuristic is a combination of motion sensor data indicating multiple card swipes, and associated card read data indicating that none of the associated card reads were successful.

As part of determining the heuristic, a card swipe detect method as discussed above related to step 110 can be determined. The motion sensor and card read data received during step 110 can be analyzed to determine characteristics or heuristics of a distinctive motion pattern associated with a card swipe. As discussed above, the distinctive motion pattern can include, in addition to the motion and acceleration that occurs during the card swipe, the vibrations that occur during the card swipe. The card read data can be used to determine that a card swipe occurred, and the associated motion sensor data can be analyzed to determine the characteristics or heuristics of the card swipe motion. Step 115 can include computer system 220 determining the heuristic based at least in part on the motion sensor data and the card read data.

Step 120 includes receiving, from a first mobile device, card swipe motion sensor data and associated card read data from a card swipe of a first card reader coupled to the first mobile device. Step 120 can occur after any of step 105-115. Using the example of FIG. 2, card reader 210 can be directly and physically coupled to mobile device 205, a smart phone in this example, such that the two components can move in unison. Mobile device 205 can include a motion sensor, which can be integrated. When user 225 swipes card 215 through card reader 210, both card reader 210 and mobile device 205 can move in unison. The card swipe motion sensor data is the data generated by mobile device 205's integrated motion sensor during or associated with the card swipe of card 215 through card reader 210. The associated card read data is the data generated by card reader 210 from or associated with the card swipe.

The associated card read data can further be no data. For example, a card swipe can be detected based on the motion sensor data. Due to a bad card reader, there may be no card read data from the card read associated with the card swipe. In such a case, there would be motion sensor data indicating a card swipe, and the associated card read data would be no data, indicating that no card read occurred. Step 120 can include computer system 220 receiving, from mobile device 205, card swipe motion sensor data and associated card read data from user 225's swipe of card 215 using card reader 210, which is coupled to mobile device 205.

Step 125 includes determining that the card swipe motion sensor data and the associated card read data indicate that the first card reader is malfunctioning based at least in part on the heuristic. Step 125 can occur after step 120. Using the example of FIG. 2, computer system 220 can determine that the first card reader is malfunctioning. The heuristic can be, for example, that multiple card swipe were detected, but there was no associated successful card read. The card swipe motion sensor data can be analyzed to determine that a card swipe occurred. The card read data associated with the card swipe can be analyzed to determine that the card read associated with the card swipe was unsuccessful. Step 125 can include computer system 220 determining that the card swipe motion sensor data, which can indicate that a card swipe occurred, and the associated card read data, which can indicates that the associated card read was bad, indicate that card reader 210 is malfunctioning based at least in part on the heuristic Step 130 includes causing a replacement card reader to be sent to an address associated with the first mobile device. Using the example of FIG. 2, computer system 220 can have access to a customer database that associates identifying information from mobile devices to customers, and that associates customers to their addresses. Computer system 220 can receive identifying information, such as a mobile identification number (MIN) or a mobile subscription identification number (MSIN), from mobile device 205. Computer system 220 can execute one or more database lookup commands to determine the user associated with mobile device 205, such as user 225, and to determine the address associated with user 225. Step 130 can include computer system 220, having determined that card reader 210 is malfunctioning or is about to malfunction, causing a new card reader to be shipped to the address associated with user 225.

Figure 2:
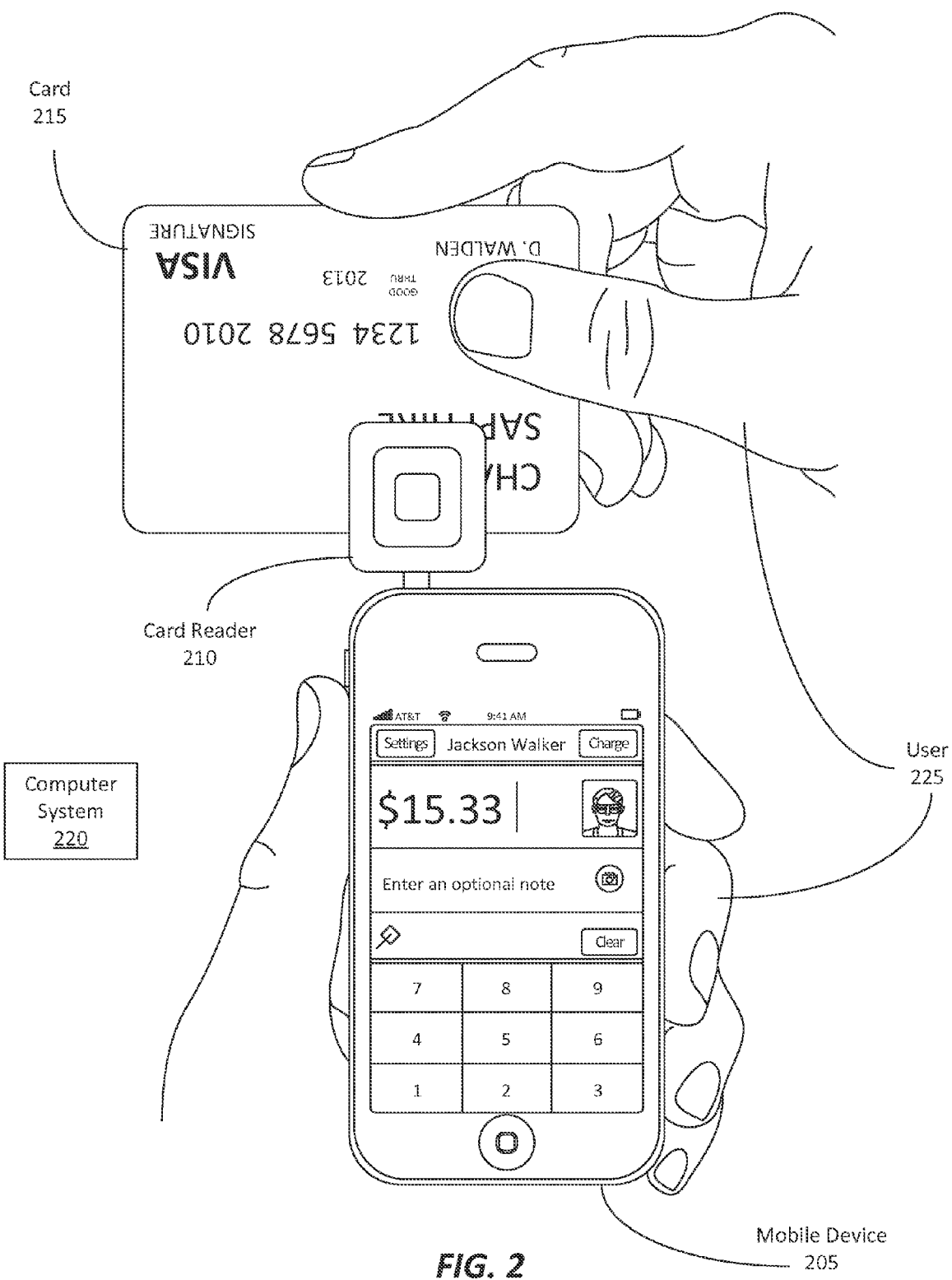
FIG. 2 is a schematic diagram illustrating components of or associated with a method for detecting a malfunctioning card reader.
Figure 3:
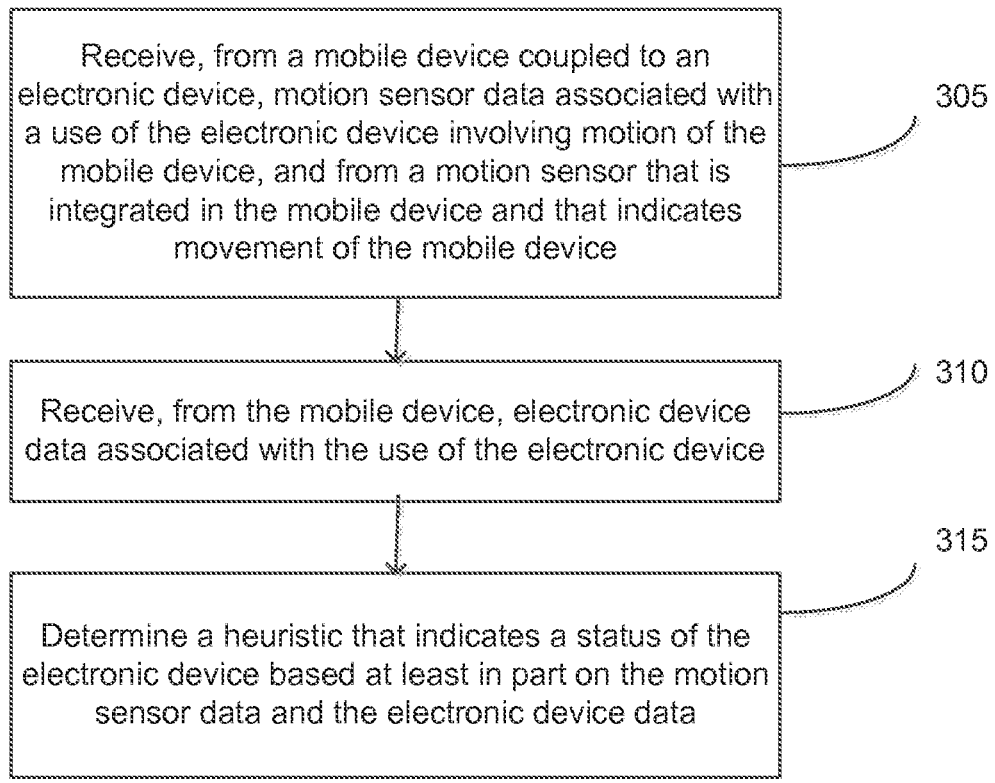
FIG. 3 is a flow chart illustrating operations of a method for determining a heuristic that indicates a status of an electronic device.

FIG. 2 is a diagram illustrating components of or associated with a method for detecting a malfunctioning card reader. FIG. 3 includes mobile device 205, card reader 210, card 215, computer system 220, and user 225. Examples of mobile devices, such as mobile device 205, include smart phones such as an iPhone, tablets such as an iPad, portable media devices such as an iPod, wearable devices such as Google Glass or Samsung Smartwatch, or a laptop or other portable computer. Card reader 210 can be an electronic device. Computer system 220 can be computer system 700 of FIG. 7. In various embodiments, card 215 can be a magnetic stripe card, a smart card, a proximity card, a re-programmable magnetic stripe card, a card containing a quick response (QR) code, a card containing a bar code, a credit card, charge card, an ATM card, a debit card, a pre-paid credit card, a pre-paid debit card, a gift card, a stored value card, and a fleet card, among others. A financial transaction card can be card 215, among other cards.

FIG. 3 is a flow chart illustrating operations of a method for determining a heuristic that indicates a status of an electronic device. The following description of FIG. 3 will be described using the system illustrated in FIG. 2, and will refer to labels of that figure. This is a non-limiting example and is done with the intent of making the description of FIG. 3 easier to understand. It is noteworthy that, in some embodiments, including the embodiment of FIG. 2, all steps of the method of FIG. 3 can be carried out by computer system 220.

Step 305 includes receiving, from a mobile device coupled to the electronic device, motion sensor data associated with a use of the electronic device involving motion of the mobile device, and from a motion sensor that is integrated in the mobile device and that indicates movement of the mobile device. Using the example of FIG. 2, mobile device 205 can be the mobile device. Mobile device 205 can include a motion sensor, which can be integrated, and which can indicate motion by generating data that characterizes the motion. For example, the motion sensor can generate data representing an acceleration vector for the motion sensor, which indicates an acceleration of the motion sensor along that vector. Card reader 210 can be the electronic device. Mobile device 205 can be directly and physically coupled to card reader 210 such that mobile device 205 and card reader 210 move in unison.

The use of the electronic device involving motion of the mobile device can be a card swipe of card 215 through card reader 210 by user 225. The card swipe induces motion in mobile device 205 due to the physical coupling between card reader 210 and mobile device 205. The motion sensor data can be the data generated by mobile device 205's motion sensor during or associated with the card swipe. Step 305 can include computer system 220 receiving, from mobile device 205 which is coupled to card reader 210, motion sensor data associated with a use of card reader 210 involving motion of mobile device 205, from a motion sensor that is integrated in mobile device 205 and that indicates movement of mobile device 205. The use can be a card swipe of card 215 through card reader 210 by user 225.

Step 310 includes receiving, from the mobile device, electronic device data associated with the use of the electronic device. Step 310 can occur before or after step 305. Using the example of FIG. 2, the mobile device can be mobile device 205 and the electronic device can be card reader 210. The electronic device data can be the data generated by card reader 210 during or associated with the card swipe referred to in step 305. The use of the electronic device can be the use of card reader 210 during the card swipe referred to in step 305. The electronic device data can include the data read by card reader 210 from the magnetic stripe of card 215, as well as other information or data. For example, the electronic device data can include information as to whether or not the card read was successful, time and date information, information related to the purpose for which the card swipe is happening (for example, information such as the sales price related to a purchase transaction, when the card swipe is for paying for the purchase transaction). Step 310 can include computer system 220 receiving, from mobile device 205, card read data associated with the use of card reader 210, the use being the card swipe referred to in step 305.

Step 315 includes determining a heuristic that indicates a status of the electronic device based at least in part on the motion sensor data and the electronic device data. Step 315 can occur after both steps 305 and 310. Using the example of FIG. 2, the electronic device can be card reader 210. The motion sensor data can be the motion sensor data of step 305. The electronic device data can be the electronic device data of step 310. A heuristic that indicates a status of the electronic device can be, for example, a heuristic that indicates that card reader 210 is malfunctioning, as discussed in step 125 of FIG. 1. The status can be, for example, malfunctioning or will soon malfunction. Will soon malfunction can be defined, for example, as a probability above a predetermined threshold that the electronic device will malfunction within a certain predetermined time frame.

As discussed in step 105 of FIG. 1, an example of a heuristic that indicates a status of the electronic device based at least in part on the motion sensor data and the electronic device data can be a combination of motion sensor data indicating multiple card swipes, and associated card read data from or associated with the card swipes indicating that none of the associated card reads were successful. A second example of such a heuristic can be a first set of motion sensor data and associated card read data indicating multiple card swipes in a predetermined time period and no successful card read in the predetermined time period.

The determination of these example heuristics is based at least in part on the motion sensor data because the motion sensor data can be used to determine the characteristics of heuristics of a distinctive motion pattern associated with a card swipe, as is discussed in step 115 of FIG. 1. The determination of these example heuristics is based at least in part on the electronic device data because the electronic device data can be used to determine that a card swipe occurred, as is discussed in step 115 of FIG. 1. Step 315 can include computer system 220 determining a heuristic that indicates a status of the electronic device based at least in part on the motion sensor data and the electronic device data.

Figure 4:
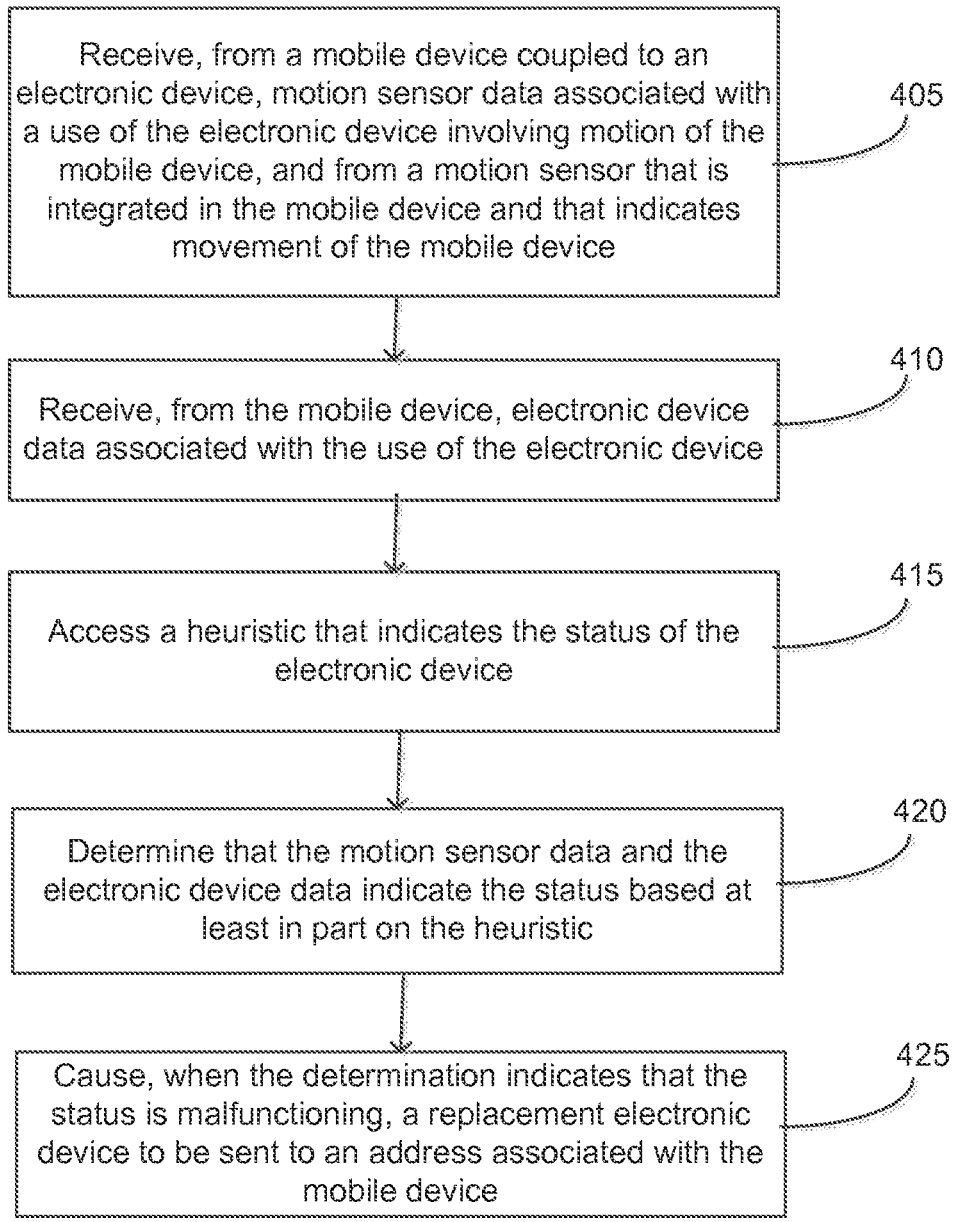
FIG. 4 is a flow chart illustrating operations of a first method for determining a status of an electronic device.

FIG. 4 is a flow chart illustrating operations of a first method for determining a status of an electronic device. The following description of FIG. 4 will be described using the system illustrated in FIG. 2, and will refer to labels of that figure. This is a non-limiting example and is done with the intent of making the description of FIG. 4 easier to understand. It is noteworthy that, in some embodiments, including the embodiment of FIG. 2, all steps of the method of FIG. 4 can be carried out by computer system 220.

Step 405 includes receiving, from a mobile device coupled to an electronic device, motion sensor data associated with a use of the electronic device involving motion of the mobile device, and from a motion sensor that is integrated in the mobile device and that indicates movement of the mobile device. Using the example of FIG. 2, the mobile device can be mobile device 205. The electronic device can be card reader 210. Mobile device 205 can be directly and physically coupled to card reader 210 such that mobile device 205 and card reader 210 move in unison.

In some embodiments, other sensors may replace or be in addition to the motion sensor. The other sensors can be integrated in the mobile device and can indicate the movement of the mobile device or some other physical manifestation of the mobile device. The sensors can include a camera, a microphone, an audio sensor, an accelerometer, a pressure sensor, a location sensor, a global positioning system (GPS) sensor, a temperature sensor, a humidity sensor, a magnetic field sensor, an electric field sensor, a light sensor, an infrared light sensor, and a proximity sensor, among other sensors. Some example may be helpful. A camera can indicate motion by the scene of the picture changing. A microphone can indicate motion by sounds of objects changing. For example, a microphone can indicate motion of an approaching train by the change in the sound of the train whistle as the train passes. A humidity sensor can indicate a change in the dampness of the device, with higher humidity indicating a more damp device. A proximity sensor can indicate motion of the mobile device by indicating a change in proximity to a stable object. These are just a couple of non-limiting examples as to how the sensors can indicate some physical manifestation of the mobile device.

Mobile device 205 can include an integrated motion sensor, which can indicate and characterize movement of mobile device 205. The motion sensor can indicate movement of mobile device 205 by sending data that characterizes the movement of the motion sensor. For example, the motion sensor can send motion sensor data that characterizes an acceleration of the motion sensor in a certain direction, or a rotation around a certain axis of rotation. The motion sensor is integrated in mobile device 205, which causes the two devices to move in unison. An indication or characterization of movement of the motion sensor will also be an indication or characterization of movement of mobile device 205, because the two devices move in unison.

The use of the electronic device involving motion of the mobile device can be a card swipe of card 215 through card reader 210 by user 225. The motion sensor data can be the data generated by mobile device 205's motion sensor during or associated with the card swipe. Step 405 can include computer system 220 receiving, from mobile device 205 coupled to card reader 210, motion sensor data associated with the use of card reader 210 involving motion, the use being a card swipe of card 215 through card reader 210 by user 225. The motion sensor data can be from the motion sensor that is integrated in mobile device 205. The motion sensor can indicate movement of mobile device 205.

Step 410 includes receiving, from the mobile device, electronic device data associated with the use of the electronic device. Using the example of FIG. 2, the mobile device can be mobile device 205. The electronic device can be card reader 210. The use of the electronic device can be a card swipe of card 215 through card reader 210 by user 225. The electronic device data can be the data generated by card reader 210 during or associated with the card swipe of step 405. The electronic device data can include the data read from the magnetic stripe of card 215, as well as other information or data. For example, the electronic device data can include information as to whether or not the card read was successful, time and date information, information related to the purpose for which the card swipe is happening (for example, information such as the sales price related to a purchase transaction, when the card swipe is to pay for the purchase transaction). Step 410 can include computer system 220 receiving, from mobile device 205, card read data associated with the card swipe of card 215 through card reader 210 by user 225.

Step 415 includes accessing a heuristic that indicates the status of the electronic device. Using the example of FIG. 2, the electronic device can be card reader 210. One or more heuristics can be stored on a storage device, such as a storage device accessible by computer system 220. The heuristics can be stored, for example, in a database, or can be stored inside of a computer program, such as in one or more computer program modules. One example of a heuristic can be that multiple card swipes were detected, such as multiple card swipes of card 215 through card reader 210 by user 225, but there was no associated successful card read, such as by card reader 210. The heuristic can include data related to detecting the card swipe, such as by detecting the distinctive physical motion associated with swiping the card through the card reader. The distinctive physical motion can include, for example, the motion and acceleration that occurs during the card swipe, as well as the vibrations that occur during the card swipe. The status that is indicated by this heuristic is that card reader 210 may be malfunctioning, or may malfunction soon. Step 415 can include computer system 220 accessing a heuristic, such as multiple card swipes being detected with no associated successful card read, that indicates a status, such as malfunctioning or soon to malfunction, of an electronics device, such as card reader 210.

A second example of a heuristic can be that a signature was detected, but there was no associated signature sent or received. The heuristic can include the distinctive physical motion associated with a person signing a signature. The distinctive physical motion can include, for example, the motion and acceleration, as well as the vibration, that occurs when a person provides a signature. The status that can be indicated by this heuristic is that a touch screen or electronic pad used to capture the signature may be malfunctioning, or may malfunction soon.

Step 420 includes determining that the motion sensor data and the electronic device data indicate the status based at least in part on the heuristic. Using the example of FIG. 2, the motion sensor data can be the data generated by mobile device 205's integrated motion sensor during a card swipe of card 215 through card reader 210 by user 225. The electronic device data can be the data generated by card reader 210 during or associated with the card swipe (i.e., the card read data). One example of a heuristic can be that multiple card swipes were detected, such as multiple card swipes of card 215 through card reader 210 by user 225, but there was no associated successful card read, such as by card reader 210. The motion sensor data can indicate that a card swipe occurred. The card read data can indicate that there was no successful card read during or associated with the card swipe. The card read data can be no data. For example, when card reader 210 is malfunctioning such that it sends no data during a card swipe, then the card reader sending no data can indicate that there was no successful card read during the card swipe. Step 420 can include computer system 220 determining that the motion sensor data, which can indicate that multiple card swipes occurred, and the electronic device data, which can indicate that there was no successful card read during or associated with the card swipe, indicate a status, which is that card reader 210 is malfunctioning or is about to malfunction, based at least in part on the heuristic.

Step 425 includes causing, when the determination indicates that the status is malfunctioning, a replacement electronic device to be sent to an address associated with the mobile device. Using the example of FIG. 2, the mobile device can be mobile device 205. The electronic device can be card reader 210. In step 420, computer system 220 determined that card reader 210 (the electronic device) is malfunctioning or is about to malfunction. Computer system 220 can have access to a customer database that associates identifying information from mobile devices with customers, and that associates customers with addresses. Computer system 220 can receive identifying information, such as a mobile identification number (MIN) or a mobile subscription identification number (MSIN), from mobile device 205. Computer system 220 can execute one or more database lookup commands to determine the user associated with mobile device 205, such as user 225, and to determine the address associated with user 225. Step 425 can include computer system 220, when the determination of step 420 indicates the status that card reader 210 is malfunctioning or is about to malfunction, causing a card reader to replace card reader 210 to be sent to an address associated with mobile device 205.

Figure 5:
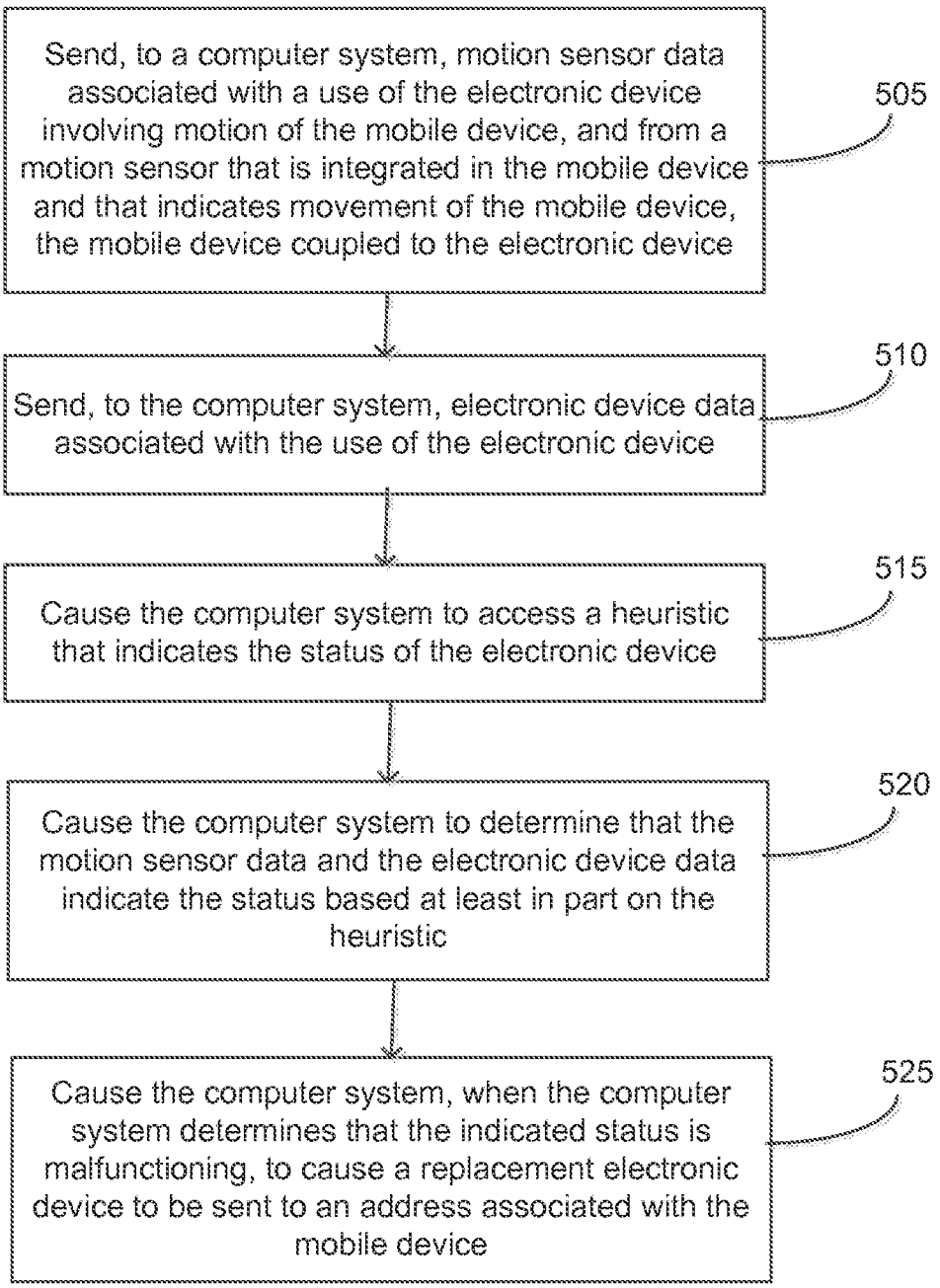
FIG. 5 is a flow chart illustrating operations of a second method for determining a status of an electronic device.

FIG. 5 is a flow chart illustrating operations of a second method for determining a status of an electronic device. The following description of FIG. 5 will be described using the system illustrated in FIG. 2, and will refer to labels of that figure. This is a non-limiting example and is done with the intent of making the description of FIG. 5 easier to understand. It is noteworthy that, in some embodiments, including the embodiment of FIG. 2, all steps of the method of FIG. 5 can be carried out by mobile device 205.

Step 505 includes sending, to a computer system, motion sensor data associated with a use of the electronic device involving motion of the mobile device, and from a motion sensor that is integrated in the mobile device and that indicates movement of the mobile device, the mobile device coupled to the electronic device. Using the example of FIG. 2, the computer system can be computer system 220. The mobile device can be mobile device 205. The electronic device can be card reader 210. Mobile device 205 can be directly and physically coupled to card reader 210 such that mobile device 205 and card reader 210 move in unison. Mobile device 205 can include an integrated motion sensor, which can indicate and characterize movement of mobile device 205. The motion sensor can indicate movement of mobile device 205 by sending data that characterizes the movement. For example, the motion sensor can send data that characterizes an acceleration in a certain direction of the motion sensor, or a rotation around a certain axis of rotation. The use of the electronic device involving motion of the mobile device can be a card swipe of card 215 through card reader 210 by user 225. The motion sensor data can be the data generated by mobile device 205's motion sensor during the card swipe. Step 505 can include mobile device 205 sending, to computer system 220, motion sensor data associated with the use of card reader 210 involving motion, the use being a card swipe of card 215 through card reader 210 by user 225. The motion sensor data can be from the motion sensor that is integrated in mobile device 205. The motion sensor can indicate movement of mobile device 205. Mobile device 205 can be coupled to card reader 210.

Step 510 includes sending, to the computer system, electronic device data associated with the use of the electronic device. Using the example of FIG. 2, the computer system can be computer system 220. The mobile device can be mobile device 205. The electronic device can be card reader 210. The use of the electronic device can be a card swipe of card 215 through card reader 210 by user 225. The electronic device data can be the data generated by card reader 210 during or associated with the card swipe. The electronic device data can include the data read from the magnetic stripe of card 215, as well as other information or data. For example, the card read data can include information as to whether or not the card read was successful, time and date information, information related to the purpose for which the card swipe is happening (for example, information such as the sales price related to a purchase transaction, when the card swipe is for paying for the purchase transaction). Step 510 can include mobile device 205 sending, to computer system 220, card read data associated with the card swipe of card 215 through card reader 210 by user 225.

Step 515 includes causing the computer system to access a heuristic that indicates the status of the electronic device. Using the example of FIG. 2, the electronic device can be card reader 210. One or more heuristics can be stored on a storage device, such as a storage device accessible by computer system 220. The heuristics can be stored, for example, in a database, or can be stored inside of a computer program, such as in one or more modules of the computer program. One example of a heuristic can be that multiple card swipe were detected, such as card swipes of card 215 through card reader 210 by user 225, but there was no associated successful card read, such as of card 215 by card reader 210. The status that is indicated by this heuristic is that card reader 210 may be malfunctioning, or may malfunction soon. Step 515 can include mobile device 205 causing computer system 220 to access a heuristic that indicates a status that card reader 210 may be malfunction, or may malfunction soon. Mobile device 205 can cause this by sending card read data associated with the use of card reader 210 to computer system 220, because the act of sending the data can cause computer system 220 to receive the data, which can cause a software program running on computer system 220 to access the heuristic.

Step 520 includes causing the computer system to determine that the motion sensor data and the electronic device data indicate the status based at least in part on the heuristic. Using the example of FIG. 2, the motion sensor data can be the data generated by mobile device 205's integrated motion sensor during a card swipe of card 215 through card reader 210 by user 225. The electronic device data can be the data generated by card reader 210 during or associated with the card swipe. One example of a heuristic can be that multiple card swipes were detected, such as multiple card swipes of card 215 through card reader 210 by user 225, but there was no associated successful card read, such as of card 215 by card reader 210.

The motion sensor data can indicate that multiple card swipes occurred. The card read data can indicate that there was no successful card read for any of the card swipes. The card read data can be no data. For example, when card reader 210 is malfunctioning such that it sends no data during a card swipe, then the card reader sending no data can indicate that there was no successful card read during the card swipe. Step 520 can include mobile device 205 causing computer system 220 to determine that the motion sensor data, which can indicates that multiple card swipes occurred, and the electronic device data, which can indicate that there was no successful card for any of the card swipes, indicate the status, which is that card reader 210 is malfunctioning or is about to malfunction, based at least in part on the heuristic.

Step 525 includes causing the computer system, when the computer system determines that the indicated status is malfunctioning, to cause a replacement electronic device to be sent to an address associated with the mobile device. In some embodiments, a replacement electronic device can be caused to be sent when the status is about to malfunction. Using the example of FIG. 2, the mobile device can be mobile device 205. The electronic device can be card reader 210. In step 520, mobile device 205 can cause computer system 220 to determine that card reader 210 (the electronic device) is malfunctioning or is about to malfunction.

Computer system 220 can have access to a customer database that associates identifying information from mobile devices with customers, and that associates customers with their addresses. Computer system 220 can receive identifying information, such as a mobile identification number (MIN) or a mobile subscription identification number (MSIN) from mobile device 205. Computer system 220 can execute one or more database lookup commands to determine the user associated with mobile device 205, such as user 225, and to determine the address associated with user 225, the address also being associated with mobile device 205. Mobile device 205, when the determination of step 520 indicates the status that card reader 210 is malfunctioning or is about to malfunction, can cause computer system 220 to cause a replacement card reader to be sent to an address associated with mobile device 205.

Figure 6:
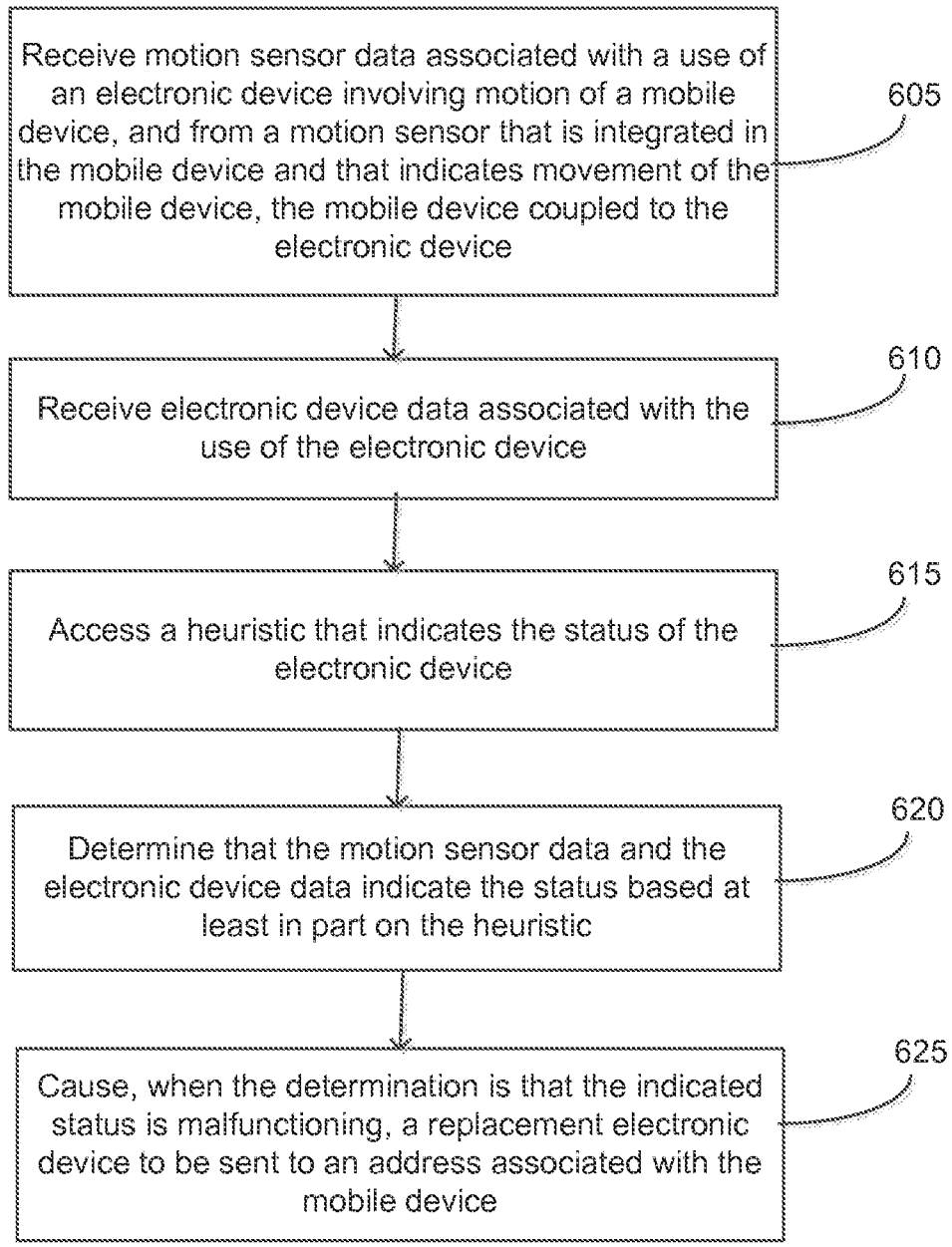
FIG. 6 is a flow chart illustrating operations of a third method for determining a status of an electronic device.

FIG. 6 is a flow chart illustrating operations of a third method for determining a status of an electronic device. The following description of FIG. 6 will be described using the system illustrated in FIG. 2, and will refer to labels of that figure. This is a non-limiting example and is done with the intent of making the description of FIG. 6 easier to understand. It is noteworthy that, in some embodiments, including the embodiment of FIG. 2, all steps of the method of FIG. 6 can be carried out by computer system 220. It is also noteworthy that, in some embodiments, including the embodiment of FIG. 2, all steps of the method of FIG. 6 can be carried out by mobile device 205.

Step 605 includes receiving motion sensor data associated with a use of the electronic device involving motion of a mobile device, and from a motion sensor that is integrated in the mobile device and that indicates movement of the mobile device, the mobile device coupled to the electronic device. Using the example of FIG. 2, the mobile device can be mobile device 205. The electronic device can be card reader 210. The motion sensor that is integrated in the mobile device can be mobile device 205's integrated motion sensor, the integration such that the integrated motion sensor and mobile device 205 can move in unison. Mobile device 205 can be directly and physically coupled to card reader 210, such that mobile device 205 and card reader 210 move in unison.

The integrated motion sensor can indicate and characterize movement of mobile device 205 by sending data that characterizes the movement of the integrated motion sensor. For example, the integrated motion sensor can send motion sensor data that characterizes an acceleration of the integrated motion sensor in a certain direction, or a rotation around a certain axis of rotation. Because the integrated motion sensor and mobile device 205 move in unison, an indication or characterization of movement of the integrated motion sensor will also indicate or characterize movement of mobile device 205.

The use of the electronic device involving motion of the mobile device can be a card swipe of card 215 through card reader 210 by user 225. The motion sensor data can be the data generated by mobile device 205's integrated motion sensor during or associated with the card swipe. Step 605 can include in some embodiments computer system 220 receiving, and in some embodiments mobile device 205 receiving, motion sensor data associated with a use of card reader 210 involving motion of mobile device 205. The motion sensor data can be from mobile device 205's integrated motion sensor. The integrated motion sensor can indicate movement of mobile device 205.

Step 610 includes receiving electronic device data associated with the use of the electronic device. Using the example of FIG. 2, the mobile device can be mobile device 205. The electronic device can be card reader 210. The use of the electronic device can be a card swipe of card 215 through card reader 210 by user 225. The electronic device data can be the data generated by card reader 210 during or associated with the card swipe of step 605. The electronic device data can include the data read from the magnetic stripe of card 215, as well as other information or data. Step 610 can include in some embodiments computer system 220 receiving, and in some embodiments mobile device 205 receiving, card read data associated with the card swipe of card 215 through card reader 210 by user 225.

Step 615 includes accessing a heuristic that indicates the status of the electronic device. Using the example of FIG. 2, the electronic device can be card reader 210. One or more heuristics can be stored on a storage device, such as a storage device accessible in some embodiments by computer system 220, and in some embodiments by mobile device 205. The heuristics can be stored, for example, in a database, or can be stored inside of a computer program, such as in one or more modules of the computer program. One example of a heuristic can be that multiple card swipes were detected, such as multiple card swipes of card 215 through card reader 210 by user 225, but there was no associated successful card read, such as by card reader 210. The status that is indicated by this heuristic is that card reader 210 may be malfunctioning, or may malfunction soon. Step 615 can include in some embodiments computer system 220 accessing, and in some embodiments mobile device 205 accessing, a heuristic, such as multiple card swipes being detected with no associated successful card read, that indicates a status, such as malfunctioning or soon to malfunction, of an electronics device, such as card reader 210.

Step 620 includes determining that the motion sensor data and the electronic device data indicate the status based at least in part on the heuristic. Using the example of FIG. 2, the motion sensor data can be the data generated by mobile device 205's integrated motion sensor during a card swipe of card 215 through card reader 210 by user 225. The electronic device data can be the data generated by card reader 210 during or associated with the card swipe (i.e., the card read data). One example of a heuristic can be that multiple card swipes were detected, such as multiple card swipes of card 215 through card reader 210 by user 225, but there was no associated successful card read, such as by card reader 210.

The motion sensor data can indicate the multiple card swipes occurred. The card read data can indicate that there was no successful card read during or associated with the card swipe. The card read data can be no data. For example, when card reader 210 is malfunctioning such that it sends no data during a card swipe, then the card reader sending no data can indicate that there was no successful card read during the card swipe. Step 620 can include in some embodiments computer system 220 determining, and in some embodiments mobile device 205 determining, that the motion sensor data, which indicates that a card swipe occurred, and the electronic device data, which indicates that there was no successful card read during or associated with the card swipe, indicate a status, which is that card reader 210 is malfunctioning or is about to malfunction, based at least in part on the heuristic.

Step 625 includes causing, when the determination indicates that the status is malfunctioning, a replacement electronic device to be sent to an address associated with the mobile device. Using the example of FIG. 2, the mobile device can be mobile device 205. The electronic device can be card reader 210. In step 620, computer system 220 or mobile device 205 determined that card reader 210 (the electronic device) is malfunctioning or is about to malfunction. Thus, the determination of step 625 is the determination of step 620 that card reader 210 is malfunctioning or is about to malfunction. In some embodiments, mobile device 205 can cause a replacement electronic device to be sent to an address associated with the mobile device by sending a message to a computer system, such as computer system 220, notifying a software program running on the computer system to send the replacement electronic device.

A computer system, such as computer system 220, can have access to a customer database that associates identifying information from mobile devices with customers, and that associates customers with addresses. Computer system 220 can receive identifying information, such as a mobile identification number (MIN) or a mobile subscription identification number (MSIN), from mobile device 205. A computer system, such as computer system 220, can execute one or more database lookup commands to determine the user associated with mobile device 205, such as user 225, and to determine the address associated with user 225. Computer system 220 can cause a replacement electronic device to be sent to the address associated with the user, the user and the address further associated with mobile device 205. Mobile device 205 can cause a replacement electronic device to be sent to an address associated with mobile device 205 by notifying a computer system, such as computer system 220, to send a replacement electronic device.

In some embodiments, step 625 can include computer system 220, when the determination of step 620 indicates the status that card reader 210 is malfunctioning or is about to malfunction, causing a card reader to replace card reader 210 to be sent to an address associated with mobile device 205. In some embodiments, step 625 can include mobile device 205, when the determination of step 620 indicates the status that card reader 210 is malfunctioning or is about to malfunction, causing a card reader to replace card reader 210 to be sent to an address associated with mobile device 205.

Figure 7:
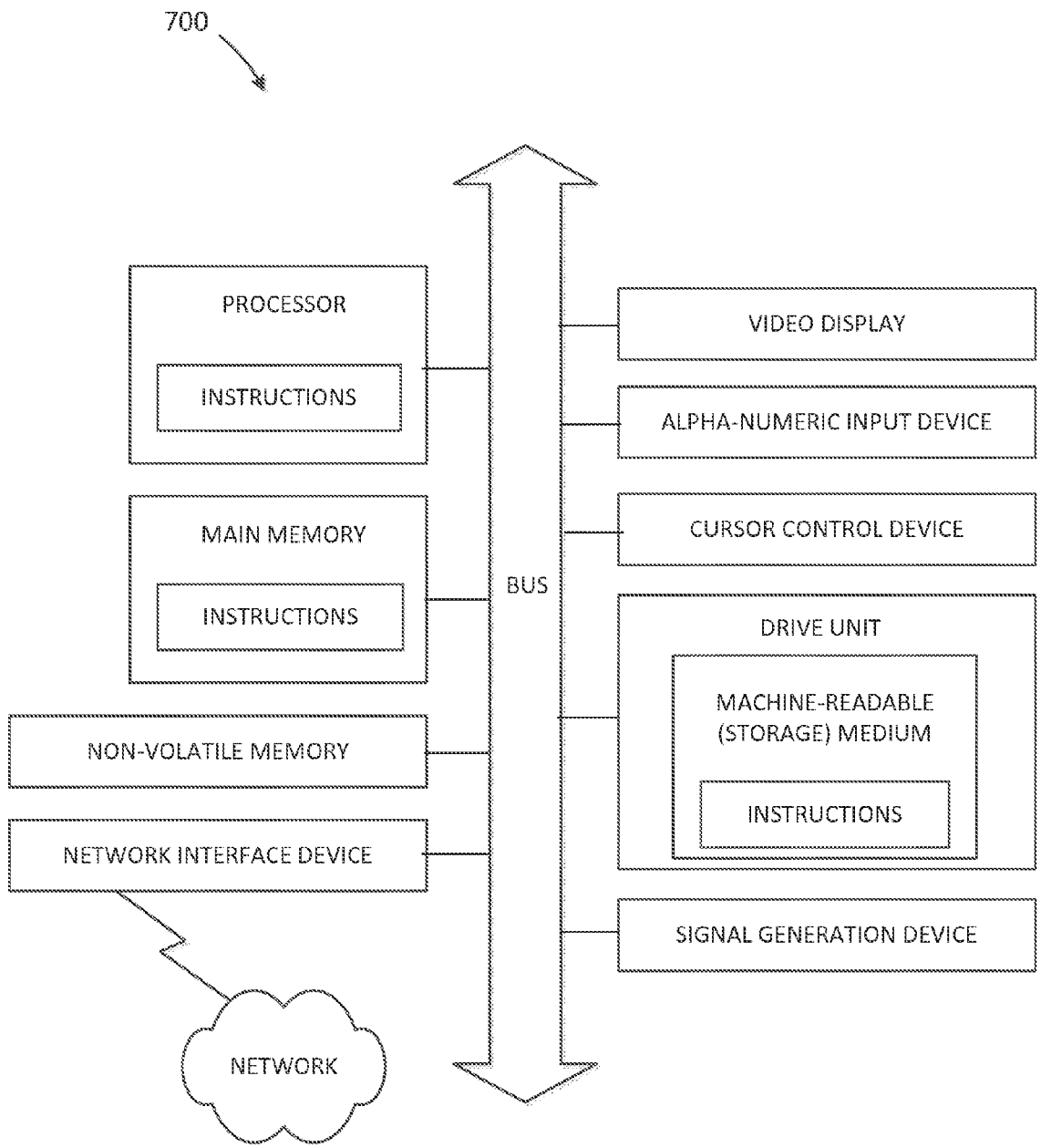
FIG. 7 is a block diagram illustrating a computing system.

FIG. 7 is a diagrammatic representation of a machine in the example form of a computer system within which a set of instructions, for causing the machine to perform any one or more of the methodologies or modules discussed herein, may be executed. In the example of FIG. 7, the computer system 700 includes a processor, memory, non-volatile memory, and an interface device. Various common components (e.g., cache memory) are omitted for illustrative simplicity. The computer system 700 is intended to illustrate a hardware device on which any of the components depicted in the examples of FIGS. 1-6 (and any other components described in this specification) can be implemented. The computer system 700 can be of any applicable known or convenient type. The components of the computer system 700 can be coupled together via a bus or through some other known or convenient device.

This disclosure contemplates the computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 700 may include one or more computer systems 700; be unitary or distributed; span multiple locations; span multiple machines; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

The processor may be, for example, a conventional microprocessor such as an Intel Core microprocessor or an Intel Itanium microprocessor or a Motorola power PC microprocessor or a SPARC architecture processor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) or static RAM (SRAM). The memory can be local, remote, or distributed.

The bus also couples the processor to the non-volatile memory and drive unit. The non-volatile memory cane be a magnetic floppy or hard disk, a magnetic-optical disk, an optical disk, a flash memory such as NAND flash memory or NOR flash memory, a read-only memory (ROM) such as a CD-ROM, a programmable read-only memory such as EPROM or EEPROM, a magnetic or optical card, or another form of storage for large amounts of data. Some of this data is often written, by a direct memory access process, into memory during execution of software in the computer 700. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, storing the entire program in memory may not even be possible. Nevertheless, one should understand that for software to run, if necessary, the software is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. A person of ordinary skill will appreciate that a modem or network interface can be considered to be part of the computer system 700. The interface can include an analog modem, ISDN modem, cable modem, token ring interface, satellite transmission interface (e.g., "direct PC"), Wi-Fi interface, or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, this disclosure assumes that controllers of any devices not depicted in the example of FIG. 7 reside in the interface.

The computer system can have one Bus or multiple Buses. A bus can include for example, a system bus, a Peripheral Component Interconnect (PCI) bus or PCI-Express bus, a HyperTransport or industry standard architecture (ISA) bus, a small computer system interface (SCSI) bus, a universal serial bus (USB, USB 2.0, USB 3.0), IIC (I2C) bus, an Institute of Electrical and Electronics Engineers (IEEE) standard 1394 bus, also called "Firewire," a QuickPath Interconnect bus, a ThunderBolt interconnect bus, a DisplayPort interconnect bus or its companion standards Mini DisplayPort (mDP), Direct Drive Monitor (DDM), Embedded DisplayPort (eDP), Internal DisplayPort (iDP), Portable Digital Media Interface (PDMI), Wireless DisplayPort (wDP), and Mobility DisplayPort (MyDP), an HDMI interconnect bus, a DVI bus.

In operation, the computer system 700 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Figure 8:
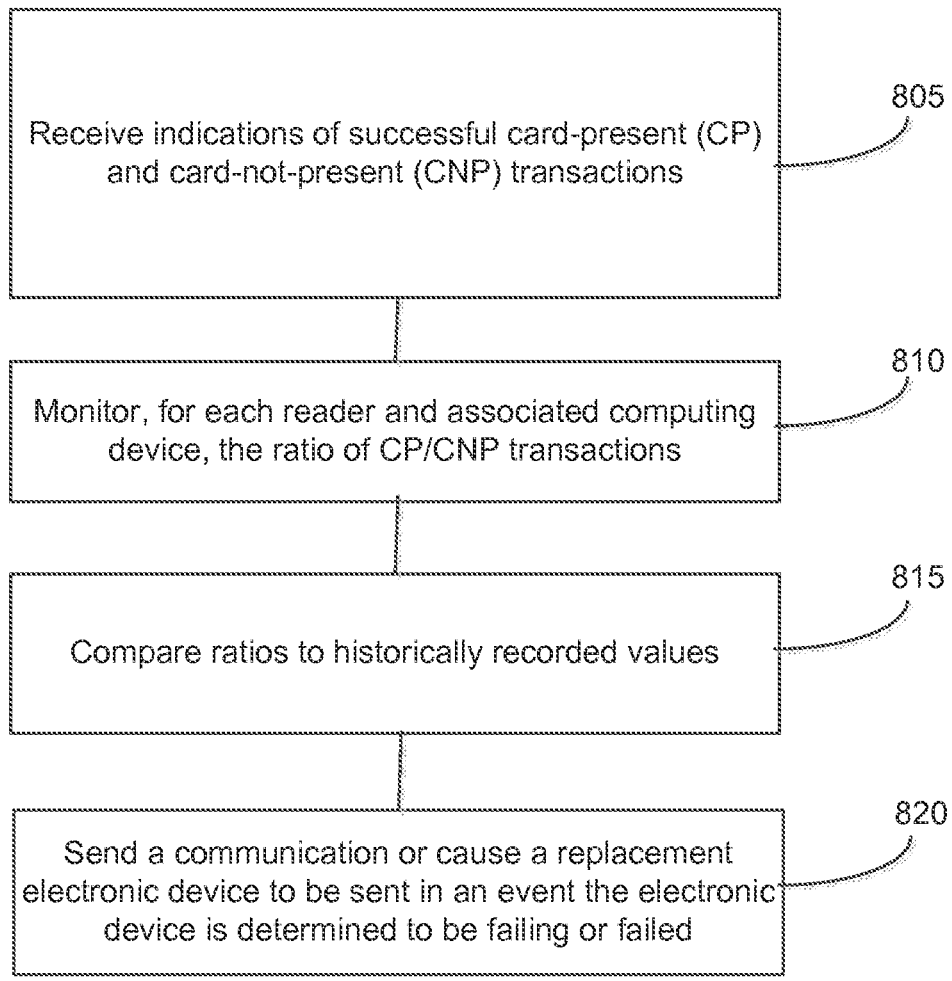
FIG. 8 is a flow diagram illustrating a routine invoked by the technology in various embodiments to determine if an electronic device is failing.

FIG. 8 is a flow diagram illustrating a routine invoked by the technology in various embodiments to determine if an electronic device is failing. At block 805, the routine receives indications of successful transactions, whether they are card-present (CP) or card-not-present (CNP). At block 810, the routine monitors the ratio of CP/CNP transactions, e.g., by storing and analyzing the transactions over time. The storage and analysis can occur on a per-merchant basis, per-card reader basis, per-computing-device basis, and so forth. At block 815, the routine compares the ratios to historically recorded values. At block 820, the routine determines whether to take a remedial action based on a determination that a card reader or computing device is failing. As an example, if the card reader is determined to be failing, the routine may cause a replacement card reader to be sent to the merchant. On the other hand, if the routine determines that it is the computing device that is problematic, the routine may transmit a communication to the merchant, e.g., to use a different computing device. One skilled in the art that alternative actions may also be possible.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. Referring to these signals as bits, values, elements, symbols, characters, terms, numbers, or the like has proven convenient at times, principally for reasons of common usage.

One should bear in mind, however, that all of these and similar terms are to be associated with the appropriate physical quantities and are merely convenient labels applied to these quantities. Unless specifically stated otherwise as apparent from the following discussion, one should appreciate that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or constructing more specialized apparatus to perform the methods of some embodiments may prove more convenient. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a laptop computer, a tablet, a set-top box (STB), a personal digital assistant (PDA), a cellular telephone, an iPhone, a Blackberry, a smart phone, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an embodiment to be a single medium, the term "machine-readable medium" and "machine-readable storage medium" (or variants thereof) should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), Blu-ray disks, among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

A person having ordinary skill in the art will appreciate that there are various other ways to implement the described functionality. The scope of this disclosure also includes embodiments implementing the described functionality in these various other ways. Accordingly, the scope of the present disclosure is intended to embrace all such alternatives, modifications, and variations as fall within the scope of the claims, together with all equivalents thereof.

Numerous specific details are set forth in order to provide a thorough understanding of the embodiments. One skilled in the art will appreciate that the embodiments may be implemented without some of these specific details. In other instances, well-known structures and devices are shown in block diagram form.

Embodiments of the present invention include various steps. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware. The steps may be rearranged or combined, substeps may be added, etc.

What is claimed is:

1. A method performed by a computing system for detecting a potentially malfunctioning payment card reader, comprising:
   receiving, at the computing system from a first mobile computing device, information indicating whether or not a payment card was read by a first payment card reader during payment transactions;
   receiving, at the computing system from a second mobile computing device, information indicating whether or not a payment card was read by a second payment card reader during payment transactions;
   identifying, at the computing system, payments made by reading payment cards as card-present (CP) payment transactions and payments made without reading payment cards as card-not-present (CNP) payment transactions, wherein CP payment transactions occur by payment card readers automatically reading data encoded at payment cards and CNP payment transactions occur by collecting manually entered payment card information without automatically reading data encoded at payment cards;
   monitoring, at the computing system, a ratio of CP to CNP transactions at each of the first and the second mobile computing devices;
   determining, at the computing system based at least in part on the monitored ratios, which of the first or the second card readers or the first or the second mobile computing devices is malfunctioning; and causing a remediation action, wherein the remediation action is at least one of sending a replacement card reader or transmitting a communication.

2. The method of claim 1, further comprising:
storing information relating to the payment transactions; and
comparing the monitored ratios to the stored information to determine which of the first or the second card readers or the first or the second mobile computing devices is malfunctioning.

3. The method of claim 2, further comprising determining that the first and the second mobile computing devices are malfunctioning in an event that the monitored ratios are decreasing.

4. The method of claim 1, wherein the communication is an informational message.

5. A computer-readable storage memory storing computer-executable instructions, comprising:
instructions for receiving, from a mobile computing device, payment information for multiple successfully completed transactions, wherein the payment information includes card-present transactions and card-not-present transactions; and
instructions for determining status of an electronic device based at least in part on the payment information for the successfully completed transaction.

6. The computer-readable storage memory of claim 5, wherein the electronic device is a payment card reader and the status is determined by comparing a ratio of the card-present transactions to the card-not-present transactions.

7. The computer-readable storage memory of claim 6, wherein the ratio is analyzed over time to determine status of the electronic device.

8. The computer-readable storage memory of claim 7, wherein the electronic device is determined to have a failing status in an event that the ratio is decreasing.

9. The computer-readable storage memory of claim 7, wherein the electronic device is determined not determined to have a failing status in an event that the ratio is decreasing but previously stored transaction information is associated with a different computing device.

10. The computer-readable storage memory of claim 5 further comprising instructions for identifying an action based on the status.

11. The computer-readable storage memory of claim 10, further comprising instructions for transmitting a communication.

12. The computer-readable storage memory of claim 10, further comprising instructions for causing a replacement electronic device to be sent.

13. A system, comprising:
a component configured to receive, from a mobile computing device, payment information for multiple successfully completed transactions, wherein the payment information includes card-present transactions and card-not-present transactions; and
a component configured to determine status of an electronic device based at least in part on the payment information for the successfully completed transaction.

14. The system of claim 13, wherein the electronic device is a payment card reader and the status is determined by comparing a ratio of the card-present transactions to the card-not-present transactions.

15. The system of claim 14, wherein the ratio is analyzed over time to determine status of the electronic device.

16. The system of claim 15, wherein the electronic device is determined to have a failing status in an event that the ratio is decreasing.

17. The system claim 15, wherein the electronic device is determined not determined to have a failing status in an event that the ratio is decreasing but previously stored transaction information is associated with a different computing device.

18. The system of claim 13 further comprising a component configured to identify an action based on the status.

19. The system of claim 18, further comprising a component configured to transmit a communication.

20. The system of claim 18, further comprising a component configured to cause a replacement electronic device to be sent.

* * * * *